United States Patent Office 2,767,676
Patented Oct. 23, 1956

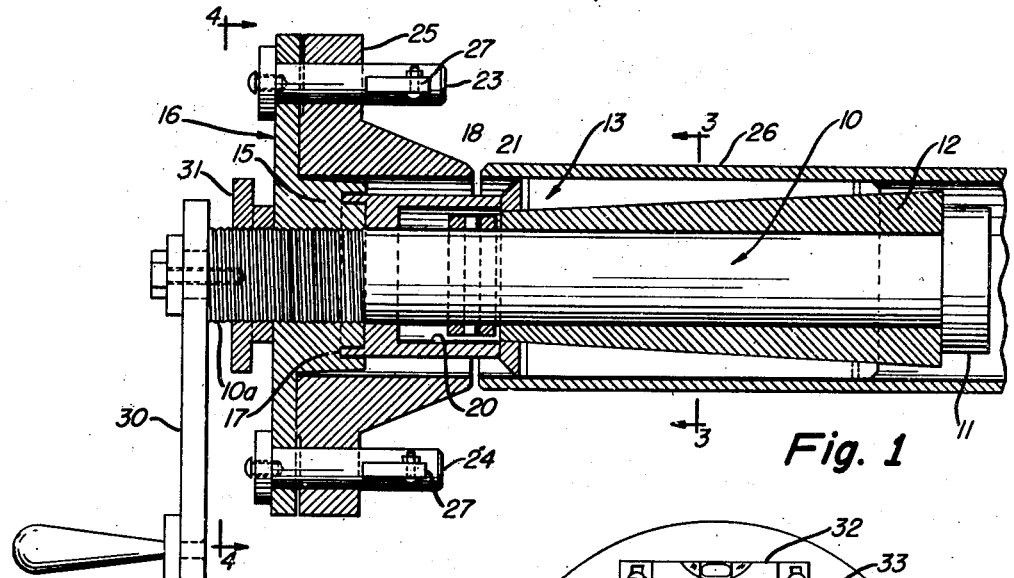
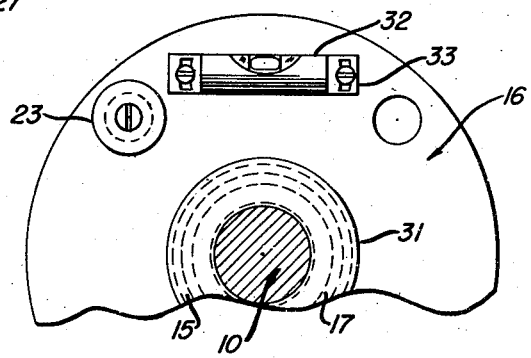
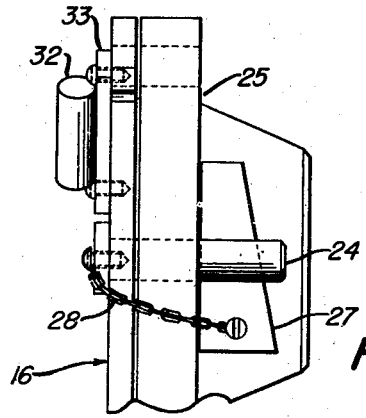
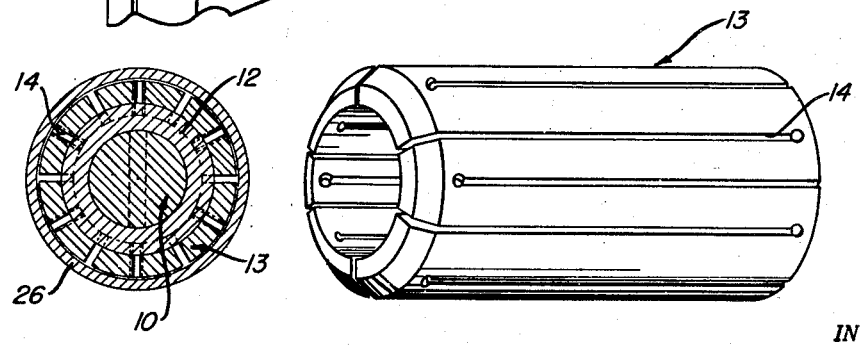
INVENTORS:
Herbert W. Johnson
George Menyea
BY Everett A. Johnson
ATTORNEY

2,767,676

FIXTURE FOR BUTT WELDING FLANGES

Herbert W. Johnson and George Menyea, Chicago, Ill., assignors to Standard Oil Company, Chicago, Ill., a corporation of Indiana Application October 30, 1952, Serial No. 317,801

2 Claims. (Cl. 113—103)

This invention relates to welding apparatus and more particularly to a device for assuring perfect alignment of weld neck flanges to pipe.

An important object of the invention is to provide means for supporting pipe flanges while butt welding them in position. Heretofore this has ordinarily been done by positioning the pipe to which the flange is to be welded in a V jig and supporting the flange in opposition to the end of the pipe. The flange is then tack-welded to the pipe at spaced points preliminary to the final complete welding operation. Such a system employing a V jig involves a considerable loss of time, is difficult to manipulate when the pipe is already in position, and non-uniform welding conditions resulted since it was not possible to maintain the optimum spacing between the flange and pipe end.

A specific object of our invention is to provide means which will support the flange and the adjacent end of the pipe to maintain the proper spacing between the boss of the flange and the pipe end. A further object of our invention is to provide means for maintaining perfect alignment between these parts during the welding operation.

An additional object is to provide an apparatus which is of such construction that it may be readily positioned in the pipe and support the flange. Another object is to provide such an apparatus which is readily clamped into position in a manner which insures and maintains concentricity of the pipe and flange. These and other objects of our invention will become apparent as the description thereof proceeds.

Briefly our invention includes an assembly which has an expanding sleeve adapted to fit within the pipe with the weld neck flange in place. An arbor with a tapered bushing fits within the sleeve and by means of a screw the tapered bushing is moved axially thereby expanding the split sleeve and securing the apparatus in place inside the pipe. The center arbor is thereby held rigidly and in alignment. A flange on said arbor supports the weld neck flange and is threaded back about 0.125 inch from the end of the pipe which is the desired spacing to assure a good penetration of weld. The supporting flange is held in this spaced relation by means of a lock nut on the threaded position of the arbor. The lock nut also serves to keep the weld neck flange at right angles to the center line of the pipe.

A plurality of flange supporting pins extend rearwardly from the supporting flange and are adapted to enter and pass through the bolt holes of the flange to be welded. A wedge key is driven through an axial slot in each of the pins to hold the outer face of the pipe flange adjacent the rear face of the supporting flange.

After the pipe flange and pipe have been tack-welded in the desired spacing, the arbor screw is turned and the tapered bushing is moved inward of the expanding sleeve thereby allowing the expanding sleeve to retract. This permits the removal of the apparatus from the pipe.

The flange and the pipe should not only be held in alignment but should be properly spaced to avoid burning metal on the interior in such a way as to produce an inside projecting fin or seam. The space by which the flange and pipe sections are separated will vary with the particular piece to be joined and the space shown is, therefore, simply for illustration.

Further details of our invention will be described with reference to a preferred embodiment thereof illustrated in the drawings wherein:

Figure 1 is a sectional view showing the clamp and flange in position on the pipe;

Figure 2 is a perspective of the expanding sleeve;

Figure 3 is a section taken along the line 3—3 in Figure 1;

Figure 4 is a fragmentary front view of the supporting flange and level; and

Figure 5 is a fragmentary top view showing the details of a wedge and pin which support the flange to be welded.

Referring now more particularly to the drawings, an arbor shaft 10 having a head 11 passes axially within a tapered bushing 12 which is in a slide fit with the expanding sleeve 13. The sleeve is provided with a multiplicity of longitudinal slots 14, alternate pairs of which terminate short of opposite ends of the sleeve 13.

The arbor shaft 10 is threaded at 10a to engage a threaded bore 22 in boss 15 which is integral with the support plate or disc 16 and has a tapered outer wall surface. Interposed on the end face of the expanding sleeve 13 and an annular recess 17 in the boss 15 is a spacer cylinder or drum 18. This spacer 18 is in compression between the face of boss 15 and the end of expanding sleeve 13. A bore in the spacer 18 is in slide fit with the shaft 10 and an enlarged bore 20 accommodates a stop ring 21 which is pinned to the shaft 10 and restricts axial movement of the tapered bushing 12 along shaft 10 in one direction and a terminal stop or head 11 prevents axial movement in the other.

The support disc 16 is provided with a pair of flange supporting pins 23 and 24. The flange to be welded to the end of the pipe 26 is passed over the pins 23 and 24 and secured thereon by means of wedges 27 passing through slots in the pins 23 and 24, the wedges being linked to the device by chain 28.

A crank 30 is fixed to the outer end of the arbor shaft 10 in any conventional manner and lock nut 31 is threaded about the arbor shaft 10 and prevents rotation of the arbor shaft 10 and, therefore, avoids premature retraction of the expanding sleeve 13.

In Figures 4 and 5 a level 32 is illustrated. The purpose of the level 32 is to align the flange plate 16 so that the bolt holes in flange 25 will line up properly at each end of a pipe 26. Ordinarily the assembly is arranged within a pipe in such a manner that the level 32 is in its center position, thereby positioning the flange supporting pins 23–24 in a uniform arrangement. However, if it is desired to weld a flange onto a pipe end which is to mate with a flange already in place and not level, then the support 33 for the level 32 may be adjusted while the assembly is in position on the misaligned flange so that when the assembly is transferred to the second pipe and centered on the adjusted level, then the bolt holes in the two flanges will be in alignment.

The holding tool illustrated in the drawing is adapted not only to align the sections to be welded and to hold them in properly spaced relation, but to be adaptable for small variations in the internal diameter of the flange and pipe section. The tool is adapted to engage the pipe section at a point which is remote from the weld whereby the weld is not affected and the device is not damaged by the welding process.

Although we have described our invention with reference to a particular embodiment which is set out in considerable detail, it should be understood that this is by way of illustration only. Accordingly, modifications by those skilled in the art are contemplated without departing from scope of the invention described herein or defined by the appended claims.

We claim:

1. An apparatus for holding a flange in abutment with a pipe section end for welding thereto comprising in combination an expandable wedge means including a hollow cylinder, a plurality of slots in said cylinder, each slot extending from one end of the cylinder to a plane adjacent the other end, alternate slots being open to opposite ends and extending to the plane adjacent the other end of the cylinder, a supporting plate, a boss on said plate, an annular channel in said boss, a threaded bore through said boss, a worm shaft threaded within said bore and extending axially within said cylinder, a tapered bore through said expandable cylinder, a correspondingly tapered bushing carried by said worm shaft, a bushing stop means at one end of said shaft, a bushing stop ring on said shaft intermediate said bushing and said plate, said ring and said stop means confining said tapered bushing on a portion of said shaft extending within said tapered bore, a spacer tube encircling said shaft and having one end in said channel and the other in abutment with the adjacent end of the tapered bushing, and a plurality of pin means extending rearwardly from said plate parallel to the longitudinal axis of said pipe for positioning a flange in spaced alignment with the end of a pipe section in welding position.

2. An apparatus for aligning a section of pipe and a flange means in abutment therewith comprising in combination a hollow cylinder having an internally tapered wall, a plurality of peripherally spaced longitudinal slots in said cylinder wall, each slot extending from one end to a plane adjacent the other end of said cylinder, alternate slots being open to opposite ends and extending to the plane adjacent the other end, a tapered hollow bushing means longitudinally slidable within said cylinder, the tapered surface of such bushing being in engagement with the internal tapered surface of said slotted cylinder, and an arbor means extending longitudinally within said cylinder and said bushing, said arbor means including a transverse plate, said plate extending radially beyond the outer wall of said cylinder and beyond the outer wall of such section of pipe, a threaded bore in said plate, a boss on said plate through which said threaded bore passes, an annular groove in said boss, a spacer collar supported in said groove and engaging the inner end of the said cylinder externally of said shaft, and a screw shaft means rotatably fixed to said tapered bushing and passing through said threaded bore, whereby said arbor means is adapted to effect movement of said bushing relative to said cylinder to expand it from end to end.

References Cited in the file of this patent

UNITED STATES PATENTS

| | | |
|---|---|---|
| 138,947 | Smith | May 13, 1873 |
| 725,874 | Riley | Apr. 21, 1903 |
| 831,095 | Polson | Sept. 18, 1906 |
| 1,813,096 | Stenner | July 7, 1931 |
| 1,940,910 | Hickey | Dec. 26, 1933 |
| 2,323,039 | Hill | June 29, 1943 |
| 2,522,459 | Mitchell | Sept. 12, 1950 |
| 2,524,168 | Harnish | Oct. 3, 1950 |
| 2,585,343 | Newlon | Feb. 12, 1952 |
| 2,667,139 | Campbell | Jan. 26, 1954 |
| 2,668,511 | Eberle et al. | Feb. 9, 1954 |

FOREIGN PATENTS

| | | |
|---|---|---|
| 367,095 | Germany | Jan. 16, 1923 |